United States Patent [19]

Wortman

[11] 4,392,225
[45] Jul. 5, 1983

[54] TELEPHONE CARRIER SYSTEM REPEATER AND POWER SUPPLY

[75] Inventor: Donald W. Wortman, Central Islip, N.Y.

[73] Assignee: TII Corporation, Lindenhurst, N.Y.

[21] Appl. No.: 234,725

[22] Filed: Feb. 17, 1981

[51] Int. Cl.³ .............................................. H04J 1/10
[52] U.S. Cl. ......................................... 370/75; 455/7; 455/63; 455/68; 179/170 R
[58] Field of Search .................. 370/69, 75, 6; 455/7, 455/63, 14, 68, 70, 72; 333/18; 179/170 R, 170.8

[56] References Cited

U.S. PATENT DOCUMENTS

| 2,876,283 | 3/1959 | Lundry | 333/18 |
| 3,423,535 | 1/1969 | Hochgraf et al. | 370/75 |
| 4,242,542 | 12/1980 | Kimbrough | 370/75 |

Primary Examiner—Benedict V. Safourek
Attorney, Agent, or Firm—LeBlanc, Nolan, Shur & Nies

[57] ABSTRACT

A signal-amplifying telephone carrier repeater which is automatically self-adjusting for both cable length and cable gauge in a plural channel, frequency division multiplexed, amplitude modulated carrier system. Also disclosed herein is a subscriber power supply which delivers sufficient power to the subscriber terminal load despite variations in load current due to changes in the number of channels in the carrier system. The power supply also has a back-up unit which operates to deliver power to the load in the event that a fault occurs in the primary supply.

7 Claims, 6 Drawing Figures

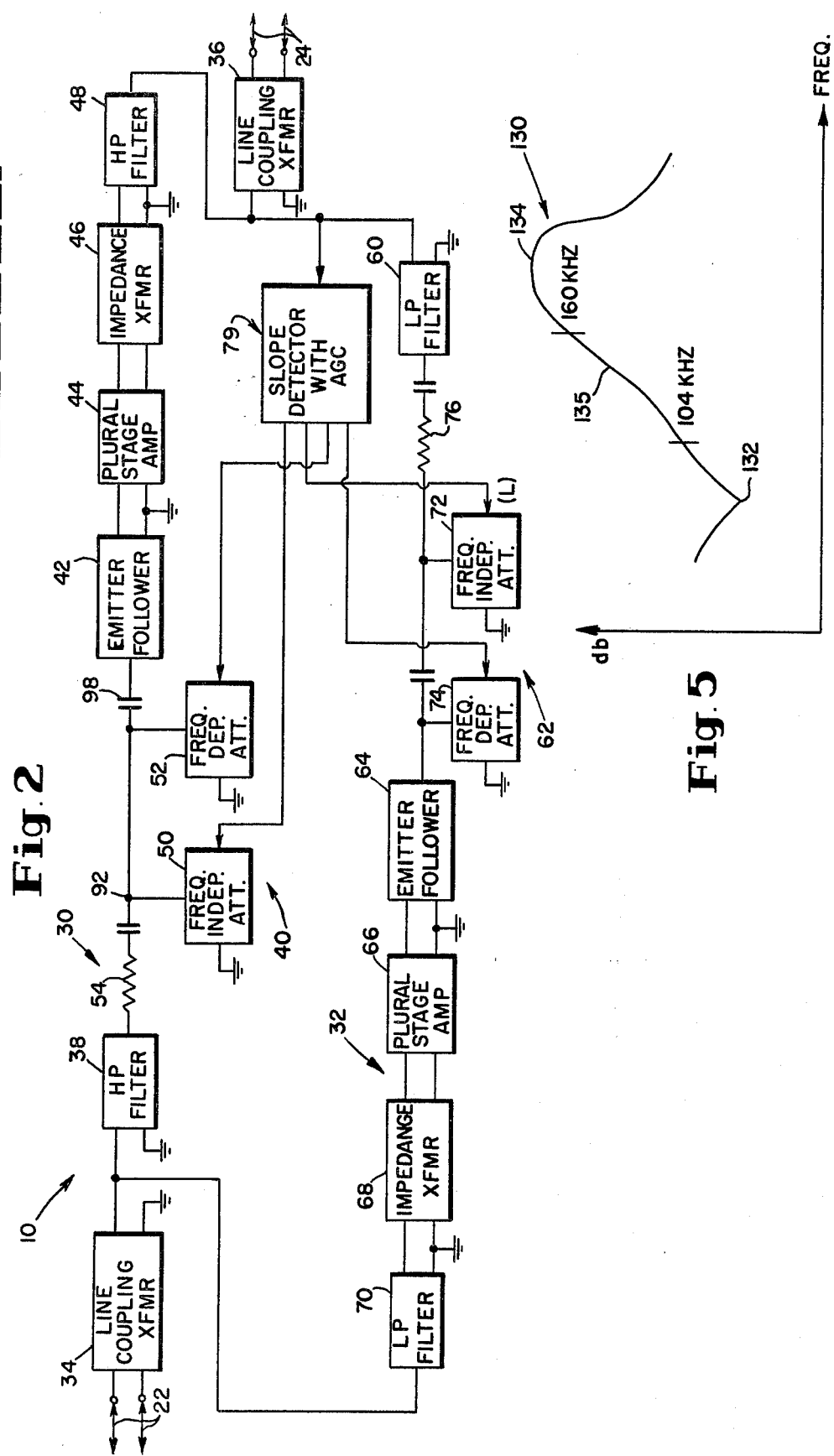

TELEPHONE CARRIER SYSTEM REPEATER AND POWER SUPPLY

FIELD OF INVENTION

The present invention relates to improvements in telephone carrier system repeaters and particularly to repeaters that are used in plural channel, frequency division multiplexed, amplitude modulated carrier systems. This invention also relates to power supplies for carrier systems.

BACKGROUND

In some telephone carrier systems of the particular type mentioned above, the transmission line between carrier terminals is so long that one or more signal-amplifying repeaters are needed to compensate for line attenuation of the carrier signals. Such repeaters are connected to the transmission line at spaced apart locations between the carrier terminal equipment at one end of the line and the carrier terminal equipment at the other end of the line.

Known repeaters for such plural channel, frequency division multiplexed telephone carrier systems are usually self-adjusting within limits for cable or transmission line length between the repeater and the remote signal source which may be, for example, carrier terminal equipment or another repeater. Such repeaters, however, are not automatically self-adjusting for different cable gauges or other factors affecting the cable slope independently of cable or transmission line length. For a composite of frequency division multiplexed carrier signals (i.e., carrier signals of different pre-selected frequencies) transmitted in a common direction, the cable slope is considered to be the db difference between the levels of two different ones of the carrier signals (usually but not necessarily the highest and lowest carrier frequencies) after the composite has been transmitted over the line extending between two terminals or points.

In carrier system repeaters of the type generally described in U.S. Pat. No. 3,475,561 an automatic gain control circuit operates on a composite of FDM (frequency division multiplexed) carrier signals that are transmitted in a common pre-selected direction to derive an AGC (automatic gain control) signal. This AGC signal varies with the d.c. average of the composite carrier signal and is used to provide a slope adjustment for the carrier signals that are transmitted in both directions. In a subscriber or station carrier system, for example, the AGC circuit customarily operates on the carrier composite that is transmitted from the central office terminals, and the resulting AGC signal is used to adjust the levels of both the central office-transmit carrier signals and the subscriber-transmit carrier signals.

Because it is derived from a composite of carrier signals the AGC signal mentioned above does not provide a measure of the cable or carrier signal slope in the sense that it will not be indicative of variations in the slope due to use of different cable gauges or other factors that cause the cable slope to vary independently of transmission line length. Instead, the AGC signal is merely useful as a measure of the transmission line length over which the carrier signal composite has been transmitted, and such length measurement, furthermore, is only accurate at one particular cable gauge.

As such, these prior repeaters are designed for just one particular gauge and will properly adjust within limits for cable length and slope only at the gauge for which they are designed. If they are used with cable having a different gauge, slope errors will develop. When this happens, the potential for crosstalk arises.

If such a prior repeater is used in a subscriber carrier system with a cable gauge other than the one for which it is designed, the crosstalk-producing slope error will occur in the carrier signals that are transmitted to the central office terminal equipment from the subscriber terminal equipment. It is understood that the occurrence of crosstalk is between two or more carrier systems having their separate transmission lines or wire pairs in a common sheath.

Because the AGC circuit of the prior repeaters operates on the composite of carrier signals being transmitted in one direction, a further crosstalk-producing slope error will occur if the majority of the carrier channels for which the system is designed are not in operation for one reason or another. In a typical eight channel carrier system, for example, an unacceptable crosstalk-producing slope error will probably occur if four or more channels are not in operation.

Therefore, at least four, if not more, of the eight channels in an eight channel carrier system must be kept in operation all of the time in order to make the system function properly even in situations where fewer than four channels are needed to serve available subscribers. If a telephone operating company has just two subscribers in need of carrier service, but wishes to provide for later expansion from two to eight channels, it nevertheless must initially buy enough central office channel terminal equipment to operate at least four channels, if not more, just to make the system function properly.

If the slope error abnormally increases the level of any carrier signal arriving at the central office from the subscriber terminal equipment, a central office relay sensitivity problem is created as well as the crosstalk problem mentioned above. Under such circumstances the excessively strong carrier signal will be received in an adjacent channel of the carrier terminal equipment as well as its own designated channel, thus causing operation of the central office relay for the adjacent channel to falsely signal that the subscriber assigned to the adjacent channel has come off hook.

The arrival of excessively strong carrier signals at the central office terminal equipment also creates a channel receive filter problem. This problem and the previously mentioned relay sensitivity problem can be dealt with by making the central office channel filters more selective. Such a solution is not satisfactory because it increases the manufacturing cost of the channel filters.

If the carrier signals become too strong because of slope errors or other reasons, a harmonic distortion problem also occurs with the repeater's amplifiers. To overcome the distortion problem it is necessary to use more expensive amplifiers which have a sufficiently larger dynamic range for handling the abnormally strong carrier signals without causing distortion.

As will become apparent from the following summary and detailed description, the present invention has none of the foregoing drawbacks and offers additional advantages not present in known prior repeaters.

SUMMARY AND OBJECTS OF INVENTION

With the foregoing in mind the general aim and purpose of this invention is to provide a novel telephone carrier system repeater that is automatically self-adjusting both for cable or transmission line length and for cable gauge.

More specifically it is an object of this invention to provide a novel repeater in which the outgoing amplified carrier signals are each maintained at a pre-selected level which is kept constant regardless of differences in cable gauge or other factors affecting the slope of the carrier signals arriving at the repeater for amplification.

A further important aim of this invention is to provide a novel repeater having a simplified, economical circuit for carrying out the objects set forth above.

Still another important object of this invention is to provide a novel repeater which functions properly and which is reliable in operation even though all but one of the carrier system's channels are not in operation. This feature of the present invention allows the telephone operating company to buy only so many of the central office and subscriber channel terminals as is needed at the moment to meet existing demands. Futhermore, power is conserved by being able to use only the number of central office and subscriber terminals that is needed to meet existing demands.

In the present invention the foregoing objects are accomplished by equipping the signal-amplifying repeater with a cable slope detector or sensor having two automatic gain control circuits, one operating on just one of the carrier signals in the amplified composite to provide a first d.c. gain control signal, and the other operating on just one other carrier signal in the same composite to produce a second d.c. gain control signal independently of the generation of the first gain control signal. Each gain control signal therefore is variable in dependence upon the level of just one carrier signal in the carrier signal composite. These gain control signals are therefore dependent upon mutually exclusive carrier signal levels and together represent a measure of the cable slope of the carrier signal composite arriving at the repeater for amplification.

One of two gain control signals mentioned above is applied to a frequency-independent gain adjusting device (such as an attenuator) to set the level of the carrier signal from which it was derived. Either one of the two gain control signals mentioned above may be used for this purpose. The remaining gain control signal is applied to another gain adjusting device which is frequency dependent for setting the slope of the amplified carrier signals at the output of the repeater. This second gain adjusting device may also be an attenuator and in the preferred embodiment is a combined series and parallel resonant circuit. This dual control sets the levels of the carrier signals to desired values by effectively causing the overall response curve for the two gain-adjusting devices to pivot about a particular point. In this manner the level of each carrier signal in the outgoing amplified composite is set at a predetermined value which remains constant regardless of transmission line length and regardless of cable gauge or other factors affecting cable slope independently of cable or transmission line length.

As applied to station or subscriber carrier systems, the repeater of this invention will properly adjust the levels of central office-transmit carrier signals for a wide cable gauge range which is limited as a practical matter only by component values of parts making up the repeater circuit. For example, the repeater of this invention may use any cable gauge size extending from at least as low as 19 gauge to at least as high as 26 gauge without causing any significant error in the level adjustment of the central office-transmit carrier signals. Furthermore, the repeater of this invention is self-adjusting for an exceptionally wide range of transmission line lengths extending from 25 db to at least 40 db as measured at the standard 112 kHz frequency. The present invention also avoids the previously mentioned central office relay sensitivity problem without utilizing expensive, highly selective channel receive filters. Still further the amplifiers used in the repeater may be of the low cost design having only moderate dynamic ranges.

According to a further feature of this invention a unique backup gain control circuit is included in the repeater for each of the primary gain control circuits mentioned above. If the carrier signals which are operated upon by the primary gain control circuits are not present for one reason or the other, the backup gain control circuits automatically come into play and operate on different carrier signals to produce the needed gain control signals. As a result, the proper operation of the repeater is not disrupted in situations where the channel terminal equipment which supply the designated carrier signals for the primary gain control circuits are removed or malfunction during operation of the carrier system.

Accordingly, a further object of this invention is to provide a novel repeater in which backup gain control circuits automatically operate in the event that the carrier signals for the primary gain control circuits are not present.

The repeater of this invention is useable in both station carrier and trunk carrier systems. The designations "station carrier" and "subscriber carrier" are used interchangeably herein to refer to those telephone carrier systems which are employed to establish communication between a central office or central station and the remote telephone stations of individual subscribers. Trunk carrier systems, on the other hand, are employed between central office exchanges (major switching points). The designations "telephone carrier" and "telephone carrier system" are used herein to refer to both trunk and station carrier systems.

A further object of this invention is to provide a novel power supply for subscriber terminal equipment in a telephone carrier system, which power supply, among other things, is characterized by a reduntant power supply circuit which automatically comes into operation in the event the primary power supply fails.

Further objects of this invention will appear as the described proceeds in connection with the below-described drawings and appended claims.

DESCRIPTION OF DRAWINGS

FIG. 1 is a schematic block diagram of a repeatered telephone carrier installation;

FIG. 2 is a schematic block diagram of the repeater shown in FIG. 1 and incorporating the principles of this invention;

FIG. 5 is a diagram of the overall response curve for the attenuators shown in FIG. 3.

DETAILED DESCRIPTION

Figure 3:
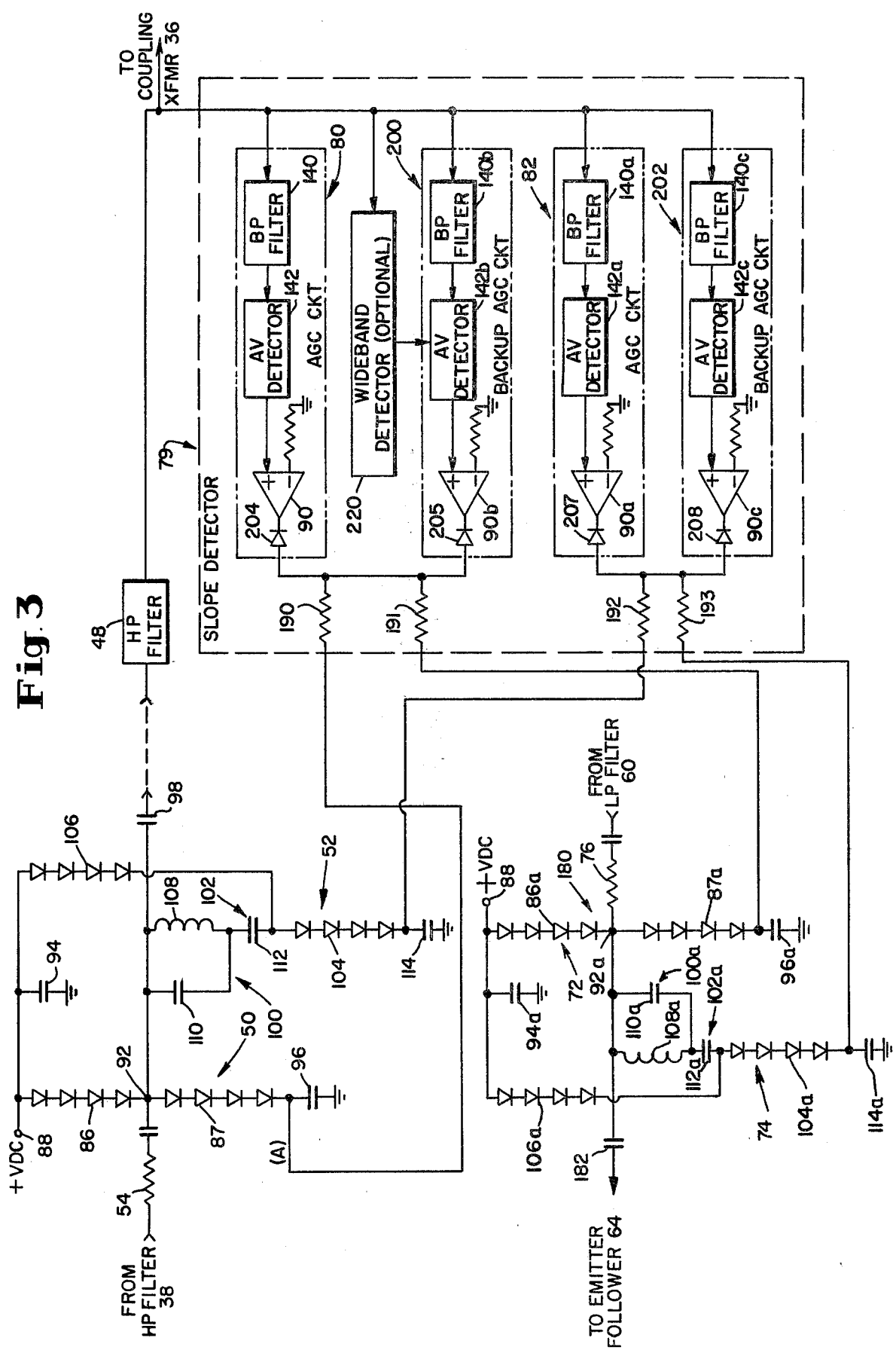
FIG. 3 is a more detailed circuit diagram of the repeater, showing the slope detector and the frequency dependent and independent attenuators for adjusting the carrier signal levels.

In FIG. 1 the repeater of this invention is indicated at 10 and is shown to be incorporated into a plural channel amplitude modulated frequency division multiplexed station carrier system 12 having a two-conductor transmission line or cable 14, a selected number of central office transmitting and receiving channel terminal circuits or units, and a corresponding number of subscriber transmitting and receiving channel terminal circuits or units. Any suitable number of central office and subscriber channel terminal circuits may be employed depending upon the number of two-way channels desired.

The illustrated embodiment is a typical eight channel system, thus requiring eight central office channel terminal circuits indicated at COT1–COT8 and eight subscriber channel terminal circuits indicated at STU1–STU8.

Each of the central office terminal circuits or units COT1–COT8 is equipped with a communication transmitter (not shown) for transmitting a carrier signal of pre-selected frequency and a communication receiver (not shown) tuned to receive a carrier signal from only a pre-selected one of the subscriber terminal circuits STU1–STU8. Similarly, each of the subscriber terminal circuits or units STU1–STU8 is equipped with a communication receiver (not shown) tuned to receive a carrier signal from only a pre-selected one of the central office terminal circuits and a transmitter (not shown) for transmitting a carrier signal of pre-selected frequency. Each of the subscriber channel terminal circuits STU1–STU8 is paired with a different one of the central office channel terminal circuits COT1–COT8 to provide eight two-way transmission channels.

As is customary in station carrier or other telephone carrier systems, each of the central office terminal circuits COT1–COT8 transmits at a pre-selected carrier frequency that is different from the transmission carrier frequencies allocated to the remainder of the central office channel terminal circuits and also different from the carrier frequencies that are transmitted up the transmission line 14 in the opposite direction from the subscriber channel terminal circuits STU1–STU8. Likewise, the subscriber terminal circuits STU1–STU8 transmit at pre-selected carrier frequencies that are different from each other and different from the transmit frequencies assigned to the central office terminal circuits COT1–COT8. The allocation of different carrier frequencies for the carriers on transmission line 14 is referred to as frequency division multiplexing (FDM).

A typical FDM allocation scheme of carrier frequencies is shown in FIG. 1 for the eight channel carrier system. According to this allocation scheme the carrier frequencies transmitted from the central office channel terminal circuit COT1–COT8 are contained in a high frequency band or group (104 kHz–160 kHz) that is higher than the group or band (8 kHz–64 kHz) containing the carrier frequencies that are transmitted from the subscriber channel terminal circuits STU1–STU8. The frequency spacing between adjacent carriers in the high group is typically 8 kHz, starting with 104 kHz for the lowest carrier frequency and ending with 160 kHz for the highest carrier frequency. The frequency spacing between adjacent carrier frequencies in the low carrier frequency group is also 8 kHz, starting with the lowest carrier frequency at 8 kHz and ending with the highest carrier frequency at 64 kHz. Each transmission channel is therefore made up of one carrier frequency from the high group and one carrier frequency from the low group to provide the needed two-way communication between the subscriber and the central office.

As shown, the central office terminal circuits COT1–COT8 form a part of the central office terminal equipment and are located at a central office or central office station which is generally indicated at 16 in FIG. 1. The subscriber channel terminal circuits STU1–STU8 form a part of the subscriber terminal equipment and are located remotely from central office 16 at the subscribers' end of transmission line 14.

Still referring to FIG. 1, the central office terminal circuits COT1–COT8 may be connected to line 14 by way of a central office group terminal unit or circuit 18 which is also located at the central office. The subscriber terminal circuits STU1–STU8 may also be connected to line 14 by way of a subscriber group terminal unit or circuit 20. The subscriber channel terminal circuits STU1–STU8 are separately connected to the telephone (not shown) of eight different subscribers by suitable means such as subscriber drops (not shown). At the central office, the central office terminal circuits COT1–COT8 are separately connected by central office drops (not shown) to appropriate terminals in the central office exchange equipment.

With continued reference to FIG. 1, all of the central office terminal circuits COT1–COT8 and unit 18 are advantageously grouped together in a single central office terminal. Similarly, all of the subscriber terminal circuits STU1–STU8 and unit 20 may also advantageously be grouped together in a single subscriber terminal as shown. The central office channel terminal circuits and the subscriber channel terminal circuits may be of any suitable design such as that disclosed in U.S. Pat. No. 4,078,639.

The central office group terminal 18 is a four wire circuit and is equipped with amplifiers for amplifying the outgoing central office-transmit carrier signal and the incoming carrier signals arriving from repeater 10. This unit may also be equipped with a suitable automatic gain control circuit for the subscriber carrier signals arriving at the central office from repeater 10. The subscriber group terminal circuit 20 is similar in design having amplifiers for amplifying the high and low groups of carrier signals as well as the automatic gain control circuitry for adjusting the levels of the central office-transmit carrier signals arriving at the subscriber terminal equipment from repeater 10.

The overall transmission line is formed by two cables or cable sections 22 and 24. Cable section 22 is connected between the central office terminal equipment and repeater 10 to feed the high group of central office-transmit carrier signals as a composite to repeater 10. Cable section 24 is connected between repeater 10 and the subscriber terminal equipment to feed or transmit the high group of carrier signals as a composite from repeater 10 to the subscriber terminal equipment. Cable 24 also feeds the low group of subscriber-transmit carrier signals from the subscriber terminal equipment to repeater 10, and cable 22 feeds this low group from the repeater to the central office terminal equipment. Repeater 10 is equipped to amplify and provide slope adjustment for the carrier signals in both the high and low groups.

In the illustrated embodiment (see FIG. 2) repeater 10 is a four-wire circuit design having a central office-to-subscriber signal transmission path 30 and a subscriberto-central office transmission path 32. Signal transmission paths 30 and 32 are interconnected between two line coupling transformers 34 and 36. Transformer 34 is connected to the end of cable 22 remote from the central office 16, and transformer 36 is connected to the end of cable 24 remote from the subscriber terminal equipment.

The central office-to-subscriber transmission signal path 30 is equipped with a high pass filter 38, a gain or level adjusting circuit 40, an emitter follower 42, a fixed gain plural stage amplifier 44, an impedance transformer 46, and another high pass filter 48. Filter 38, emitter follower 42, amplifier 44, transformer 46 and filter 48 are all connected in series circuit relationship in the signal transmission path in the manner shown.

Circuit 40 has a frequency independent portion and a frequency dependent portion. In this embodiment these portions are attenuators, the frequency independent attentuator being indicated at 50, and the frequency dependent attenuator being indicated at 52. Attenuators 50 and 52 are connected in parallel across the signal source representing the carrier signals arriving from the central office equipment. Each attenuator forms a voltage divider with a resistor 54 between filter 38 and emitter follower 42 as will be described in greater detail later on.

The high group of carrier signals transmitted from the central office terminal equipment over cable 22 is coupled by transformer 34 to filter 38. Filters 38 and 48 keep the low group of carrier signals out of the central office-to-subscriber transmission signal path 30. Emitter follower 42 provides a high a.c. input impedance for the carrier signals following level adjustment by attenuators 50 and 52. Amplifier 44 may be of any suitable circuit design such as one having a wide band fixed gain input stage, a fixed gain intermediate stage and a high input impedance, fixed gain output stage such as push-pull emitter follower. Impedance transformer 46 couples the carrier signal composite at the output of amplifier 44 to filter 48.

The subscriber-to-central office signal transmission path 32 is similar to the central office-to-subscriber signal transmission path 30 and is equipped with a low pass filter 60, a gain or level adjusting circuit 62, an emitter follower 64, a fixed gain plural stage amplifier 66, an impedance transformer 68 and a further low pass filter 70. Filter 60, emitter follower 64, amplifier 66, transformer 68, and filter 70 are all connected in series in the signal transmission path 32 between the coupling transformers 36 and 34 as shown.

Circuit 62 is similar to circuit 40 and has a frequency independent attenuator 72 and a frequency dependent attenuator 74. Attenuators 72 and 74 are connected in parallel across the signal source representing the carrier signals arriving from the subscriber terminal equipment on cable 24. Each of these attenuators forms a voltage divider with a resistor 76 between filter 60 and emitter follower 64 as will be described in greater detail later on.

The low group of carrier signals transmitted over cable 24 from the subscriber terminal equipment is coupled by transformer 36 to filter 60. Filters 60 and 70 serve to keep the high group of carrier signals out of the signal transmission path 32. Emitter follower 64, amplifier 66 and impedance transformer 68 are similar to and perform the same function as the emitter follower 42, amplifier 44, and transformer 46, respectively.

In accordance with this invention, repeater 10, as shown in FIG. 3, is equipped with an AGC (automatic gain control) slope detector or slope measuring circuit 79 (which may also be referred to as a slope sensing circuit). The AGC slope detector 79 comprises two separate automatic gain control circuits 80 and 82 each preferably having its own backup as will be described in detail later on. Gain control circuit 80 controls the frequency independent attenuators 50 and 72, and gain control circuit 82 controls the frequency dependent attenuators 52 and 74.

From the description thus far it will be appreciated that the high group of central office transmit carrier signals transmitted over cable 22 will be passed by filter 38 to attenuators 50 and 52. Attenuators 50 and 52 adjust the levels of these carrier signals. After level adjustment the carrier signals are amplified by amplifier 44 without changing the slope of the carrier signals. From amplifier 44 the amplified, level-adjusted carrier signals are coupled through transformer 46, filter 48 and transformer 36 to cable 24 for transmission to the subscriber terminal equipment.

Coming in the opposite direction, the low group of subscriber transmit carrier signals, which are fed to repeater 10 from cable 24, are passed by filter 60 to attenuators 72 and 74. Attenuators 72 and 74 adjust the levels of the carrier signals. After level adjustment the subscriber transmit carrier signals are then amplified by amplifier 66 without changing the slope of the level-adjusted carrier signals. From amplifier 66 the amplified, level-adjusted subscriber transmit carrier signals are coupled through transformer 68, filter 70 and transformer 34 to cable 22 for transmission up the line to the central office terminal equipment.

As will be described in greater detail shortly the gain control circuits 80 and 82 operate on two different preselected carrier signals in the high group of central office transmit carriers at the output of the high pass filter 48 to automatically derive the d.c. gain control signals which are applied to adjust the impedances of attenuators 50, 52, 72 and 74. In this invention, each gain control signal is dependent on one and only one carrier signal level in the high group.

During operation of the carrier system, each subscriber transmit carrier signal will be transmitted to the central office only when its assigned subscriber comes off hook. The central office transmit carrier signals, on the other hand, will be transmitted and will be present at repeater 10 all of the time. Gain control circuits 80 and 82 therefore operate to continuously provide carrier signal level adjustment throughout the operation of the carrier system.

The gain adjusting operation of the repeater 10 in this embodiment repeats or reproduces the original voltage levels which the central office transmit carrier signals had before transmission over cable 22 from the central office regardless of cable gauge and regardless of the transmission level length between the repeater and the central office. These central office transmit carrier signals customarily are transmitted flat at 0 dbm (i.e., at a common voltage level) from the central office. Following level adjustment in repeater 10, the central office transmit carrier signals will therefore be at a common voltage level at the repeater end of cable 24. Alternatively, the central office transmit carrier signals could be adjusted to different pre-selected levels at repeater 10 if desired. In either case, each central office transmit carrier signal will be adjusted by repeater 10 to a voltage level that remains constant regardless of the length of cable 22 and regardless of the gauge of cable 22 or other factors affecting cable slope independently of cable length.

The voltage levels of the subscriber transmit carrier signals in the low group may also be placed under the control of gain control circuits 80 and 82. This control of the low group causes each subscriber transmit carrier signal in the low group to arrive at the central office at a predetermined level which remains constant or fixed regardless of the length of cable 22 and regardless of the gauge of cable 22 within a relatively wide range extending from 22 gauge to at least 26 gauge. For crosstalk consideration the subscriber transmit carrier signals may arrive at the central office at levels that are different from one another as long as they are coordinated with and correspond to the levels of carrier signals of like frequencies on all other carrier system transmission lines that are grouped with cable 22 in the same sheath. Preferably, however, repeater 10 adjusts the levels of the subscriber transmit carrier signals in such a manner that they arrive at the central office at the same common level to minimize the peak voltage of the carrier signal composite.

In the illustrated embodiment the frequency independent attenuator 50 is shown in FIG. 3 to comprise two diode strings 86 and 87 connected in series between the positive terminal of a voltage source 88 and the output of a comparator 90 which forms a part of gain control circuit 80. Each diode string has a plurality of diodes (e.g., four diodes in this embodiment) connected in series with each other. Reference is made to U.S. Pat. No. 4,210,779 for this type of attenuator.

The adjacent terminals of the two diode strings 86 and 87 are interconnected at a common junction 92 in the carrier signal path between filter 38 and emitter follower 42. This diode string attenuator provides the basic AGC adjustment for the high group of carrier signals arriving at repeater 10 from the central office.

As shown, the terminals of the diode strings 86 and 87 remote from junction 92 are connected to ground through capacitors 94 and 96. For a.c. signals, diode strings 86 and 87 are therefore effectively connected in parallel between junction 92 and a.c. ground for shunting a variable portion of the incoming carrier signal composite to ground. This circuit arrangement is such that the parallel combination of diode strings 86 and 87 cooperates with resistor 54 to establish a voltage divider for dividing down the incoming central office-transmit carrier signal composite by an amount depending upon the current-dependent resistance of the diodes in strings 86 and 87. The a.c. signal output voltage from this voltage divider is developed at junction 92 and is coupled by a d.c. blocking capacitor 98 to the input of the emitter follower 42.

If the variable impedance of the parallel combination of diode strings 86 and 87 is represented by Z and the resistance of resistor 54 is represented by R, then the a.c. divider output voltage will be proportional to Z divided by the sum of Z and R. In this way the a.c. voltage divider action established by resistor 54 and the two diode strings divide down the incoming central office-transmit carrier signal composite to a value that is determined by the diode impedances in strings 86 and 87.

The impedance of diode strings 86 and 87 are determined by the direct current drawn from source 88. The amount of direct current from source 88 in turn is determined by the extent to which the diodes in strings 86 and 87 are forward biased by the voltage at the output of comparator 90. The comparator output voltage, in turn, is determined by the level of only a pre-selected one of the central office-transmit carrier signals at the output of filter 48.

As shown in FIG. 3, the frequency dependent attenuator 52 comprises a parallel resonant circuit 100, a series resonant circuit 102, and a pair of current-dependent diode strings 104 and 106. In the illustrated embodiment a single coil 108 is common to both the parallel resonant circuit 100 and the series resonant circuit 102. Thus, the parallel resonant circuit comprises coil 108 and a capacitor 110 connected in parallel with coil 108. The series resonant circuit 102 comprises coil 108 and a further capacitor 112 connected in series with coil 108. Reference is made to U.S. Pat. No. 4,210,779 for the foregoing resonant circuit configuration.

Each of the diode strings 104 and 106 has a plurality of diodes (e.g., four diodes in this embodiment) connected in series with each other. Diode strings 104 and 106 are connected in parallel between capacitor 112 and a.c. ground through capacitors 114 and 94, respectively. Additionally, diode strings 106 and 104 are connected in series between the positive terminal of voltage source 88 and the output of a comparator 90a which forms a part of the AGC circuit 82. Diode strings 104 and 106 are effectively in parallel for a.c. signals and are capable of shunting a variable portion of the incoming carrier signal composite to ground.

From the circuit connections described above it will be appreciated that capacitor 112, the parallel combination of coil 108 and capacitor 110, and the parallel combination of diode strings 104 and 106 are connected in series between junction 92 and earth ground, thus placing attenuator 52 across and hence in parallel relation to attenuator 50 and the imaginary signal source representing the central office transmit carrier signal composite arriving at repeater 10.

As seen by a.c. signals the diode strings 86 and 87 are interconnected in parallel with the parallel resonant circuit 100 to thereby define the resonant circuit's shunt resistance. The Q of the parallel resonant circuit 100 is therefore adjustable by adjusting the current-dependent impedance of diode strings 86 and 87.

Being in series with the series resonant circuit 102 the a.c. equivalent-parallel combination of diode strings 104 and 106 defines the series resistance for the series resonant circuit 102. Thus, the Q of the series resonant circuit 102 is adjustable by adjusting the current-dependent impedance of the diode strings 104 and 106. It will be appreciated that the resistance of each diode in each of the diode strings mentioned above is equal to 26 divided by the current flowing through the diode in ma.

The parallel and series resonant circuits 100 and 102 together with the parallel combination of diode strings 104 and 106 establish a frequency dependent voltage divider with resistor 54 for dividing down each of the incoming central office transmit carrier signals as a function of its own carrier frequency.

From the foregoing description it is clear that the Q of the parallel resonant circuit 100 is dependent upon the direct current fed through diode strings 86 and 87, and this direct current through diode strings 86 and 87, in turn, is dependent upon the voltage at the output of comparator 90 in AGC circuit 80. The Q of the series resonant circuits 102, on the other hand, is dependent on the direct current conducted through diode strings 106 and 104 and hence is dependent upon the voltage at the output of the comparator 90a in AGC circuit 82. Accordingly, it will be appreciated that by controlling the d.c. voltages at the outputs of comparators 90 and 90a, the Q's of the parallel and series resonant circuits 100 and 102 are adjustable independently of each other.

The parallel resonant circuit 100 is preferably tuned to a frequency somewhat higher than the highest frequency (160 kHz) transmitted down the transmission line 22 from the central office channel terminal equipment. The series resonant circuit 102, on the other hand, is preferably tuned to a frequency somewhat lower than the lowest frequency (104 kHz) that is transmitted down line 22 from the central office terminal equipment.

In FIG. 5, the response curve 130 is the result of additively combining the individual response curves of the parallel and series resonant circuits 100 and 102. The circuit is designed in such a manner to establish a straight line or an approximately straight line frequency response on curve 130 between two reference points, one being the parallel resonance of circuit 100, and the other being the series resonance of circuit 102.

As shown in FIG. 5, the response of the series resonant circuit 102 is in the form of a notch 132 at resonance since circuit 102 is in parallel with the incoming carrier signal source. On the other hand, the response of the parallel resonant circuit 100 is in the form of a peak 134. With the selection of the series and parallel resonant frequencies to bracket the central office-transmitted carrier frequencies as mentioned above, such central office-transmitted carrier frequencies will all fall on one side or skirt (indicated at 135) of the overall frequency response curve between the parallel resonant peak and the series resonant notch and preferably in the region having a substantially uniform slope.

As is known, the frequency-dependent impedance of the parallel resonant circuit 100 increases to a maximum at the parallel circuit's resonant frequency, while the frequency-dependent impedance of the series resonant circuit 102 decreases to a minimum at the series circuits's resonant frequency. Thus, the overall frequency-dependent impedance of attenuator 52 varies with the frequency and increases from a low value at the lowest of the incoming carrier frequencies to a relatively high value at the highest of the incoming carrier frequencies. The higher carrier frequencies will therefore be attenuated less than the lower carrier frequencies to compensate for the frequency-dependent attenuation that the carrier signals undergo by transmission over the transmission line.

Even though attenuators 50 and 52 operate to attenuate the incoming signals, they are nevertheless considered to be gain adjusting or gain inserting devices because they provide negative gain, namely attenuation.

Figure 4:
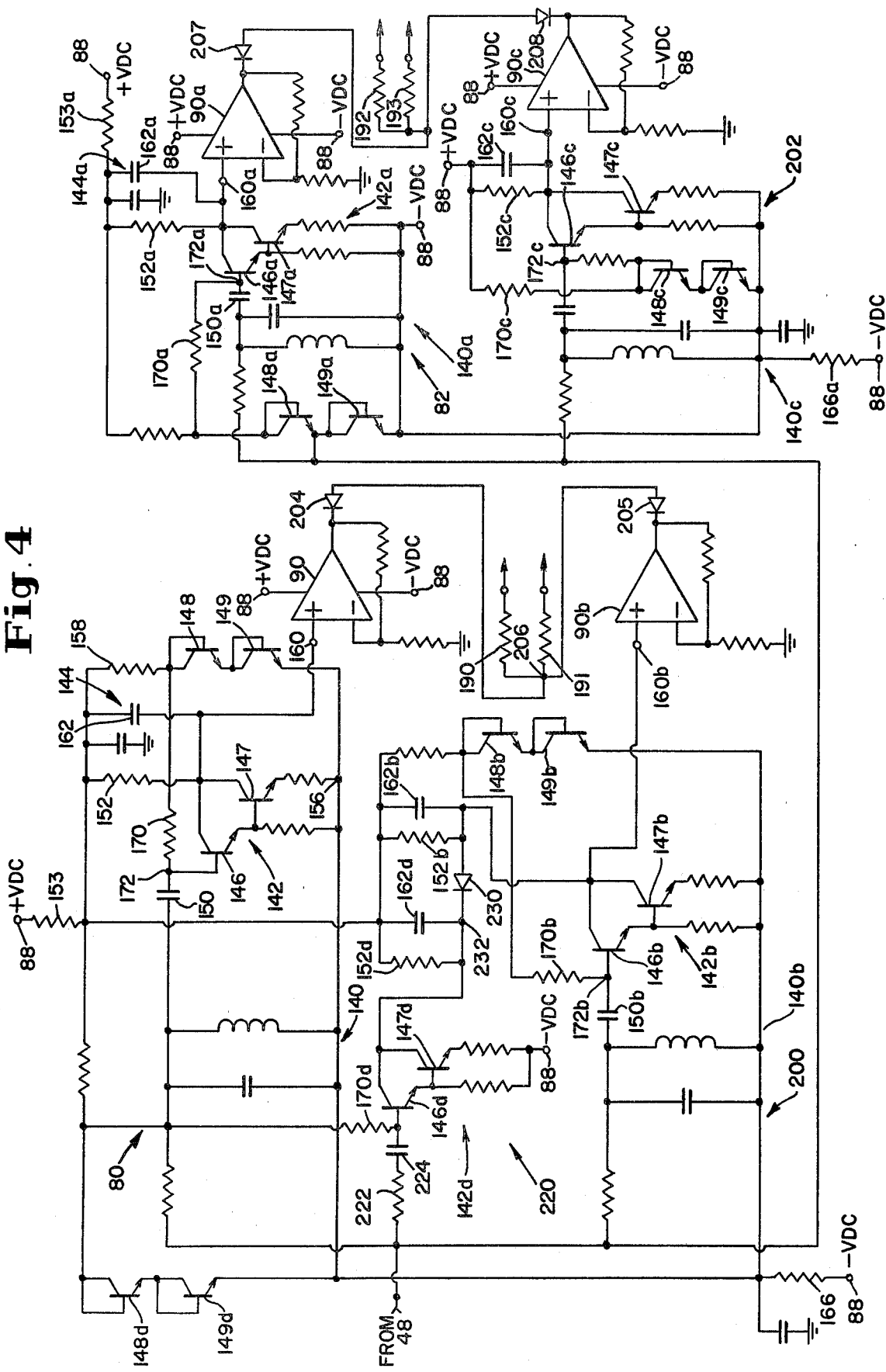
FIG. 4 is a schematic circuit diagram of the slope detector shown in FIG. 3.

Referring to FIGS. 3 and 4, the AGC circuit 80 is shown to comprise a frequency selective channel band pass filter 140, an averaging detector 142 having a filter 144, and the previously described comparator 90. Filter 140 may be of any suitable circuit design for passing just one pre-selected carrier frequency in the composite of the central office-transmitted frequencies. The frequency to which filter 140 is tuned is preferably, but not necessarily, the highest of the central office-transmitted frequencies, namely 160 kHz.

Averaging detector 142 may be of any suitable circuit design and is shown to be a half-wave averaging detector for rectifying the single carrier signal (160 kHz) which is passed by filter 140. The averaging detector's filter 144 filters the resulting half-wave rectification to provide a d.c. signal equal to or proportional to the average value of the rectified carrier signal. Comparator 90 compares the average voltage at the output of detector 142 with a fixed d.c. reference potential to establish an AGC control signal which varies with the difference between the above-mentioned average d.c. voltage and the selected reference potential. In this embodiment, the reference potential is selected at ground potential (i.e., zero volts), whereby the central office-to-subscriber transmit carrier signals are transmitted from repeater 10 flat at 0 dbm (i.e., all at the same level).

The gain-adjusted carrier signal composite at the output of the high pass filter 48 is coupled to the input of the AGC circuit's frequency selective channel filter 140 in addition to being coupled to the line coupling transformer 36. Filter 140 establishes one of two carrier frequency channels in the slope detector 79 for sensing or measuring the cable slope. The second channel will be described later on.

In the illustrated embodiment, the frequency selective channel filter 140 operates to pass the 160 kHz central office-transmit carrier signal and to reject all other frequencies, including the other central office-transmit carrier frequencies. The single central office-transmit carrier frequency (160 kHz) passed by filter 140 is coupled to the input of the averaging detector 142 for rectification and filtering.

In the illustrated embodiment, as shown in FIG. 4, averaging detector 142 comprises a pair of NPN transistors 146 and 147 which are connected in a Darlington configuration, and an additional pair of transistor biasing transistors 148 and 149 which are connected as diodes for biasing the transistor pair 146, 147. The 160 kHz signal at the output of filter 140 is coupled by a capacitor 150 to the base of transistor 146. The collectors of transistors 146 and 147 are connected through a collector resistor 152 and a further resistor 153 to the positive terminal of the d.c. voltage supply 88. The emitters of transistors 146 and 147 are each connected through a separate emitter resistor to a common line or node 156. The biasing transistors 148 and 149 and resistors 158 and 153 are all connected in series between the positive terminal of the d.c. voltage source 88 and the common node 156. The common node 156 is connected through a further resistor 166 to the negative terminal of the d.c. voltage source 88.

The collectors of transistors 146 and 147 are tied together and connected to an output terminal 160 of the averaging detector 142. Filter 144 comprises a capacitor 162 which is connected at one side to the collectors of transistors 146, 147. The other side of capacitor 144 is connected through resistor 153 to the positive terminal of the d.c. voltage source 88. The collector resistor 152 and the emitter resistors of transistors 146 and 147 set the gain of the transistor pair 146, 147. Being connected in a Darlington configuration, transistors 146 and 147 provide a high input impedance.

Transistors 146–149 are preferably matched to establish the proper turn-on point of transistors 146 and 147. Transistors 148 and 149 forward bias transistor 146 just up to the point where it is about to turn on or conduct so that in absence of an a.c. signal voltage at the base of transistor 146, the transistor is on the verge of turning on.

A resistor 170 is connected between the a.c. signal input 172 of the averaging detector 142 and the juncture between transistor 148 and resistor 158 to isolate the relatively low impedance, which exists at such juncture, from the carrier signal source at input 172.

From the foregoing description it will be appreciated that positive alternations of the 160 kHz carrier signal will cause transistors 146 and 147 to conduct, thus pulling the common collector voltage of the transistor pair 146, 147 negative with respect to the positive voltage of the d.c. supply 88. Capacitor 162 filters the resulting half-wave rectified peaks at the collectors of the transistor pair 146, 147 to thus provide the d.c. average of the rectified carrier signal. This d.c. average signal is applied to the positive input of comparator 90 and varies in accordance with the level or peak voltage of the 160 kHz carrier signal as it appears at the output of filter 48 following level or gain adjustment by attenuators 50 and 52.

The negative input of comparator 90 is connected through a resistor to ground, thus establishing the fixed, zero volt reference potential. Comparator 90 thus compares the d.c. average voltage with the fixed AGC reference which in this embodiment is at ground potential.

In response to the application of the 160 kHz carrier signal to averaging detector 142, capacitor 162 will charge toward ground potential to thus pull the positive input of comparator 90 to a value approaching zero volts. As a result, the output of comparator 90 will begin to switch in a negative direction from the supply voltage at source 88 (e.g., +6 VDC) and will continue decreasing to a predetermined value. The diode strings 86 and 87 will therefore be forward biased to conduct, and the amount of direct current drawn through the diodes will vary as a function of the voltage at the output of comparator 90. In particular, the amount of direct current serially conducted through diode strings 86 and 87 will increase as the voltage at the output of comparator 90 becomes more negative with respect to the positive voltage supply furnished by source 88. Thus, the impedance of diode strings 86 and 87 decreases as the voltage at the output of comparator 90 becomes more neagative with respect to the supply voltage furnished by source 88.

Due to the voltage divider effect of diode strings 86 and 87 with resistor 54, the level of the divided-down carrier signal composite at juncture 92 will therefore be decreased as the direct current through the diode strings 86 and 87 is increased. The amount of direct current drawn through diode strings 86 and 87 will continue to increase under the control of the AGC circuit 80 until the voltage at the positive input of comparator 90 approaches the fixed reference potential which in this case is zero volts.

The voltage at the input of comparator 90 will therefore continue to decrease until it reaches a value at which the AGC loop stabilizes. When this happens, the amount of direct current drawn through the diode strings 86 and 87 will stabilize at a predetermined value for a given level of the 160 kHz carrier signal. The level of the carrier signals composite at the juncture 92 will therefore stabilize at a predetermined value. The action of the AGC circuit 80 thus has the effect of continuously attempting to drive the voltage at the positive input of comparator 90 to a value equal or approaching the fixed AGC reference potential. In this way, the incoming carrier signals in the composite wave form will be adjusted by the AGC circuit 80 to predetermined values which do not change regardless of the length of the transmission line section 22 between the central office and repeater 10. It will be noted that voltage at the output of comparator 90 is a measure of the length of the transmission line section 22.

In addition to being coupled to the input of the AGC circuit 80, the carrier signal composite at the output of the high pass filter 48 is also conducted to the input of the AGC circuit 82 as shown in FIGS. 3 and 4. Circuit 82 corresponds to circuit 80 except for the frequency to which the band pass filter is tuned. Accordingly, like reference characters have been used to designate like components of the two circuits except that the reference characters designating the parts of circuit 82 have been suffixed by the letter "a" to distinguish them from the reference characters used for circuit 80.

With respect to circuit 82, the frequency selective band pass filter 140a defines the second channel for the slope detector 79 and is tuned to one of the central office-transmit carrier frequencies other than the 160 kHz carrier signal. Filter 140a is preferably tuned to the lowest carrier frequency (104 kHz) in the group of carrier frequencies transmitted from the central office.

Thus, filter 140a passes only the 104 kHz carrier signal to the averaging detector 142a while rejecting all remaining frequencies including the remaining central office-transmit carrier frequencies. Averaging detector 142a operates in the same manner as detector 142 to provide the d.c. average of the half-wave rectified 104 kHz carrier signal. This d.c. average voltage appears at the averaging detector's output 160a and is applied to the positive input of comparator 90a as shown in FIG. 4. The fixed AGC reference potential of zero volts is applied to the negative input of comparator 90a. Comparator 90a thus compares the d.c. average voltage of the rectified 104 kHz carrier signal with the fixed AGC reference.

When operation of the carrier system is initiated to transmit the carrier signal composite from the central office to the input of AGC circuit 82 as well as the AGC circuit 80, filter 140a will pass only the 104 kHz carrier signal to the averaging detector 142a for rectification. Upon rectification, capacitor 162a pulls the positive input of comparator 90a to a value approaching zero volts, causing the output of comparator 90a to begin to switch in a negative direction from the supply voltage and will continue decreasing to a predetermined value.

The diodes in strings 104 and 106 will therefore be forward biased to conduct, and the amount of direct current drawn through the diodes will vary as a function of the voltage at the output of comparator 90a. In particular, the amount of direct current conducted serially through the diode strings 104 and 106 will increase as the voltage at the output of comparator 90a becomes more negative with respect to positive supply voltage furnished by source 88.

From the description thus far it will be appreciated that the direct current at the output of comparator 90 varies as a function and only as a function of the level (average amplitude) of the 160 kHz carrier signal and none of the other carrier signals. The direct current at the output of comparator 90a, on the other hand, varies as a function of and only as a function of the level (average amplitude) of the 104 kHz central office-transmit carrier signal and none of the other carrier signals. Thus the two outputs of comparators 90 and 90a taken together provide a measure of the cable slope for the transmission line section 22 between the central office and repeater 10, such measure being the difference between the outputs of the two comparators.

From the foregoing description it will be appreciated that the Q's of the parallel and series resonant circuits 100 and 102 are adjusted independently of each other, the former being adjusted by the AGC circuit 80 and being dependent upon the voltage at the output of comparator 90, and the latter being adjusted by the AGC circuit 82 and being dependent upon the voltage at the output of comparator 90a. The d.c. current drawn through the diode strings 86 and 87 determines the Q of the parallel resonant circuit 100 and will be proportional to and only to the level or peak voltage of the 160 kHz carrier signal fed to resistor 54. The d.c. current drawn through the diode strings 104 and 106 will be dependent upon the voltage at the output of comparator 90a and will be proportional to and only to the level or peak voltage of the 104 kHz carrier signal fed to resistor 54.

As the Q of the parallel resonant circuit 100 is increased the peak of the response curve 130 rises to increase the db difference between the highest and lowest carrier frequencies in the composite of the central office-transmit carriers. As the Q of the parallel resonant circuit is decreased, the peak of the response curve 130 is lowered, thus reducing the db difference between the highest and lowest carrier frequencies in the composite of central office-transmit carriers. As the Q of the series resonant circuit 102 is increased, the carrier signal loss or attenuation increases, thus increasing the slope or the difference between the highest and lowest carrier frequencies at the output of the attenuator pair 50, 52. As the Q of the series resonant circuit 102 decreases, the loss becomes less, thus reducing the difference between the highest and lowest carrier frequencies at the output 92 of the attenuator pair 50, 52. Thus, the foregoing circuitry has the effect of setting the high frequency level (160 kHz) and the low frequency level (104 kHz) independently of each other.

It will be appreciated that as the d.c. current through the diode strings 104 and 106 is increased, the impedance of the diode strings is reduced, thus increasing the Q of the series resonant circuit 102 and vise versa. The current-dependent variable diode resistance of the diode strings 104 and 106 compensates for the slope of the central office-transmitted carrier signals arriving at the input of repeater 10 regardless of the length of the transmission line section 22 or the cable gauge of section 22 or other factors affecting cable slope independently of transmission line length. It will be noted that increasing the impedance of the diode string 104 and 106 makes the notch 132 of response curve 130 more shallow. Thus, increasing the current-dependent variable impedance of the diode strings 104 and 106 will decrease the attenuation of the lower frequencies in the composite of central office-transmit carriers arriving at the repeater. Conversely, decreasing the current-dependent variable impedance of the diode strings 104 and 106 makes the response curve notch 132 deeper, thus increasing the attenuation of the lower carrier frequencies in the composite of the central office-transmit carriers arriving at the repeater. Varying the impedance of the diode strings 104 and 106 under the control of the level of the 104 kHz carrier signal at the repeater's output thus operates to effectively pivot the response curve 130 approximately about the point of the curve'response to the 160 kHz carrier signal. The net effect is that after level adjustment by attenuators 50 and 52, all of the central office-transmit carrier signals will appear at the repeater's output at a common pre-selected level which is preferably set at zero dbm.

Should the 104 kHz carrier signal appear at the repeater's output at a level greater than zero dbm then such difference is detected or sensed by the 104 kHz AGC circuit 82 which increases the current through diode strings 104 and 106, and thus decreases the impedance of the diode strings 104 and 106 to bring the response curve notch 132 down, thus increasing the attenuation of the lower frequencies in the composite of the central office-transmit carrier signals appearing at the attenuator output 92. It will be noted that the effect of diode strings 104 and 106 is to attenuate the lower carrier frequencies in the central office carrier signal composite more than the higher frequencies in the central office-transmit composite. If the 104 kHz carrier signal arriving at the repeater's output is higher than zero dbm, the positive input of the comparator 90a goes more negative causing the output voltage of comparator 90a to become more negative and thus causing increased direct current to be conducted through diode strings 104 and 106 to increase the attenuation of the lower carrier frequencies.

If the level of the 160 kHz carrier signal exceeds 0 dbm at the output of high pass filter 48, the positive input of comparator 90 goes more negative causing the comparator's output voltage to be pulled more negative and thus causing increased direct current to be conducted through the diode strings 86 and 87 for increasing the attenuation of the 160 kHz carrier signals and to a lesser extent the other higher carrier frequencies in the central office-transmit group. If the level of the 160 kHz carrier signals is less than 0 dbm at the output of filter 48, the positive input of comparator 90 becomes positive relative to the zero voltage reference point and thus the negative input of comparator 90, causing the comparator's output voltage to become less negative relative to the positive voltage supply to thereby reduce the direct current conducted through diode strings 86 and 87. As a result, the attenuation of the 160 kHz carrier and the other high carrier frequencies is reduced, thus bringing the high carrier frequencies up to the desired common level.

In summary, the operation of attenuators 50 and 52 under the control of the AGC slope-detecting circuits 80, 82 may be summarized in the following manner: the highest carrier frequency (160 kHz) is adjusted by the AGC circuit 80 by passing just enough current through the diode strings 86 and 87 such that the level of the 160 kHz carrier signal at the repeater's output is adjusted to zero dbm or such other preselected level. The AGC circuit 82 has the effect of adjusting the response curve notch 132 to such a value where the combination of the controls effected by the AGC circuits 80 and 82 adjust the central office-transmit carrier signals to zero dbm. This adjustment of the central office-transmit carrier signals to the common zero dbm level or to any other desired pre-selected value is accomplished regardless of the value of the cable gauge of the transmission line section 22 or other factors affecting the cable slope independently of transmission line length and also regardless of the length of the transmission line section 22. So regardless of the value of the cable slope of the central office carrier signals arriving at the repeater, they all will be adjusted to some pre-selected value (e.g., zero dbm) which remain constant even though the cable gauge or cable length is changed as in going from one installation to another. Thus, the repeater of this invention is fully self-adjusting not only for transmission line length but also for cable gauge and other factors which may affect the cable slope independently of transmission line length.

For cable gauges ranging from 22 to at least 26, the d.c. control currents developed by comparators 90 and 90a may advantageously be used to control attenuators 72 and 74 to preslope the low group of carrier signals which are transmitted from the subscriber terminal units STU1-STU8 to the central office. The slope adjustment is such that the subscriber-transmit carrier signals each arrive at the central office or some other terminal point (such as another repeater) at a pre-selected level (preferably at a common pre-selected level) which remains the same regardless of the length of the transmission line section 22.

As shown in FIG. 3, the circuit configurations of attenuators 72 and 74 are advantageously the same as attenuators 50 and 52, respectively. Accordingly, like reference numerals have been applied to designate corresponding components of attenuators 50 and 72 except that the reference numerals applied to attenuator 72 have been suffixed by the letter "a" to distinguish them from the reference numerals used for attenuator 50. Likewise, like reference numerals have been applied to designate the corresponding components of attenuators 52 and 74 except that the reference characters for attenuator 74 have been suffixed by the letter "a" to distinguish them from the reference numerals used for attenuator 52.

Attenuator 72 operates to adjust the levels of the incoming subscriber-transmit carrier signals as a function of the length of the transmission line section 22 between its terminal points. Attenuator 74 in cooperation with attenuator 72 makes a slope adjustment in the subscriber-transmit carrier signals to compensate for the difference attenuations that the subscriber carrier signals will undergo upon their transmission over the transmission line 22.

As shown in FIG. 3, the diode strings 86a and 87a in attenuator 72 are connected in series between the output of comparator 90 and the positive terminal of the d.c. voltage supply source 88. The common junction between diode strings 86a and 87a is indicated at 92a and is connected in the carrier signal path between resistor 76 and the emitter follower 64.

Similar to the circuit design and operation for diode strings 86 and 87, diode strings 86a and 87a are effectively in parallel for a.c. signals and shunt a variable portion of the subscriber carrier signal composite to ground. Resistor 76 and the parallel combination established by diode 86a and 87a form a voltage divider 180 which acts in the same manner as the voltage divider that is formed by resistor 54 and the diode strings 86, 87.

The output voltage from voltage divider 180 is developed at junction 92a and is coupled to the emitter follower 64 by a d.c. blocking capacitor 182 and will depend in part upon the impedance of the diode strings 86a and 87a. The impedance of diode strings 86a and 87a will, in turn, vary inversely with the amount of direct current conducted through the diode strings, and the amount of direct current conducted through the diode strings will be varied by the voltage at the output of comparator 90.

Since the voltage at the output of comparator 90 varies with the length of the transmission line section 22 and is thereby a measure of the length of transmission line section 22, the direct current drawn through diode strings 86a and 87a will vary inversely with the length of transmission line section 22. The impedance of diode strings 86a and 87a therefore varies proportionately with the length of transmission line section 22. Thus, the longer the transmission line section becomes, the greater the composite carrier signal voltage at the output of voltage divider 180 and vice versa.

The parallel resonant circuit 100a is preferably tuned to a frequency somewhat higher than the highest subscriber-transmit carrier frequency (64 kHz). The series resonant circuit 102a is preferably tuned to a frequency somewhat lower than the lowest subscriber-transmit carrier frequency (8 kHz).

Like the parallel and series resonant circuits in attenuator 52, the response of the series resonant circuit 102a is in the form of a notch at resonance, while the resonant response of the parallel resonant circuit 100a is in the form of a peak. The overall or combined frequency response curve of circuits 100a and 102a has the same shape as that shown in FIG. 5. The band of the subscriber-transmit carrier frequencies (8 kHz to 64 kHz) therefore lies on one side or skirt of the overall response curve between the parallel resonant peak and the series resonant notch and preferably in the response curve region having a substantially uniform slope.

As described for the attenuator 102, the frequency-dependent impedance of the parallel resonant circuit 100a increases to a maximum at the parallel circuit's resonant frequency, while the frequency-dependent impedance of the series resonant circuit 102a decreases to a minimum at the series circuit's resonant frequency. The overall frequency-dependent impedance of attenuator 74 in the band of the subscriber-transmit carrier frequency thus increases from a low value at the lowest of the subscriber carrier frequencies (8 kHz) to a relatively high value at the highest subscriber-transmit carrier frequencies (64 kHz). The higher subscriber-transmit carrier frequencies will therefore be attenuated less than the lower subscriber transmit carrier frequencies to cooperate with attenuator 72 in providing the slope correction that compensates for the frequency-dependent attenuation that the carrier signals undergo by transmission over the transmission line section 22.

Attenuator 74 also forms a part of the voltage divider 180 and is connected to the juncture 92a so that the output voltage of divider 180 is proportional to the parallel combination of attenuators 72 and 74 divided by such parallel combination plus the resistance of resistor 76. Diode strings 104a and 106a, which form the series impedance for the series resonant circuit 102a, are connected in series between the positive terminal of the voltage supply source 88 and the output of comparator 90a. The common junction between diode strings 104a and 106a is connected at 92a such that the diode strings 104a and 106a are connected effectively in parallel for a.c. signals and thus shunts a variable portion of the subscriber-transmit carrier signal composite to ground. The impedance of diode strings 104a and 106a will vary inversely with the amount of direct current conducted through the diode strings, and the amount of direct current conducted through the diode strings will be varied by the voltage at the output of comparator 90a in a manner similar to that explained for diode strings 104 and 106.

Similar to the relationship of diode strings 86 and 87 to the resonant circuits, the parallel a.c. circuit combination of diode strings 86a and 87a acts as a shunt resistance across the parallel resonant circuit 100a. Variations in the shunt resistance established by diode strings 86a and 87a thus varies the circuit Q of the parallel resonant circuit. As the shunt resistance decreases the Q of the parallel resonant circuit 100a decreases to decrease the sharpness of the overall response curve for the parallel and series resonant circuits and vise versa.

Diode strings 104a and 106a act as the series resistance for the series resonant circuit 102a. Thus, variation of the impedance of diode strings 104a and 106a (by varying the direct current conducted through the diode strings) will change the series Q, causing the response curve notch to become shallower as the series circuit Q is decreased and to become deeper as the series circuit Q is increased in the same manner as described for the diode strings 104 and 106.

As previously explained, the subscriber-transmit carrier signals are in a frequency band that is lower than the frequency band containing the central office-transmit carrier signals. The subscriber-transmit carrier signals therefore undergo less attenuation than the central office carrier signals upon being transmitted over the same transmission line length. Because of this attenuation difference, it is desirable to attenuate the subscriber-transmission signal composite by an amount that is different from the attenuation imparted to the central office carrier signals. This difference in attenuation is achieved primarily by resistors 190, 191, 192 and 193. As shown, resistor 190 is connected in series with diode strings 86 and 87 between the diode strings and the output of comparator 90. Resistor 191 is connected in series with diode strings 86a and 87a between the diode strings and the output of comparator 90. Resistor 192 is connected in series with diode strings 104 and 106 between the diode strings and the output of comparator 90a. Resistor 193 is connected in series with diode strings 104a and 106a between the two diode strings and the output of comparator 90a.

By virtue of the foregoing circuit connections for resistors 190, 191 the ratio of $I_1/I_2$ will be approximately equal to the ratio of $R_2/R_1$ where $I_1$ is the amount of direct current conducted through diode strings 86 and 87, $I_2$ is the amount of direct current conducted through diode strings 86a and 87a, $R_1$ is the resistance of resistor 190, and $R_2$ is the resistance of resistor 191. In a similar fashion, the ratio of $I_3/I_4$ will be closely equal to the ratio of $R_4/R_3$ where $I_3$ is the amount of current conducted through diode strings 104 and 106, $I_4$ is the amount of direct current conducted through diode strings 104a and 106a, $R_3$ is the resistance of resistor 192, and $R_4$ is the resistance of resistor 193. Thus the ratios of $I_1/I_2$ and $I_3/I_4$ may be set at selected values by selecting the ratios $R_2/R_1$ and $R_4/R_3$ to compensate for the difference in the overall attenuation between the high band of central office-transmit carrier frequencies and the low band of subscriber-transmit carrier frequencies. The net effect of attenuators 72 and 74 is therefore to adjust the subscriber-transmit carrier signal level in such a manner that they arrive at the central office or any other termination point of transmission line section 22 each at a pre-selected level, and preferably at a common pre-selected level which remains constant regardless of the length of the transmission line section 22. Suitable voltage controlled current sources (not shown) may be used in place of resistors 190–193 to set the current ratios $I_1/I_2$ and $I_3/I_4$.

Referring back to FIG. 4, optional backup AGC circuits 200 and 202 may be provided for AGC circuits 80 and 82, respectively. The circuit design of the backup AGC circuit 200 may advantageously be the same as that of circuit 80 except for the frequency of the channel band pass filter. Similarly, the circuit design of the backup AGC circuit 202 may be the same as that of circuit 82 except for the frequency of the channel band pass filter. Accordingly, like reference numerals have been applied to designate corresponding components of AGC circuits 80 and 200 except that the reference numerals applied to circuit 200 have been suffixed by the letter "b" to distinguish them from the reference numerals used for circuit 80. Also, like reference numerals have been used to designate corresponding components of AGC circuits 82 and 202 except that the reference characters for circuit 202 have been suffixed by the letter "c" to distinguish them from the reference numerals used for the other AGC circuits.

In addition to being coupled to the input of the AGC circuits 80 and 82, the composite of the central office-transmit carrier signals at the output of filter 48 is also coupled to the inputs of the backup AGC circuits 200 and 202. The frequency selective band pass channel filter 140b in backup circuit 200 is tuned to a pre-selected central office carrier frequency other than the one to which filter 140 is tuned. In the illustrated embodiment filter 140b is tuned to the 144 kHz carrier signal to thus pass only the 144 kHz carrier signal to the averaging detector 142b. Thus, the d.c. average of the detected 144 kHz carrier signal will be supplied to comparator 90b for comparison with the fixed AGC reference (ground potential) so that the output voltage of comparator 90b will vary as a function of only the 144 kHz carrier signal level.

The outputs of comparators 90 and 90b are OR'ed together by a pair of diodes 204 and 205. With this circuit arrangement, the comparator (either 90 or 90b) having the lowest output will drive node 206 (i.e., supply direct current to node 206) by forward biasing its associated diode.

In normal operation where both the 160 kHz and 144 kHz central office transmit carrier signals are being transmitted and where both of the AGC circuits 80 and 200 are functioning properly, the output of comparator 90 will be more negative than the output of comparator 90b, thus forward biasing diode 204 and reverse biasing diode 205. If for any reason transmission of the 160 kHz carrier signal should stop or if for any reason the AGC circuit 80 malfunctions, diode 205 will become forward biased by the output of comparator 90b with the result that the AGC backup circuit 200 will automatically take over to supply the d.c. control current to diode strings 86, 87, 86a and 87a. Thus, proper operation of the carrier system will continue without interruption.

The frequency of the band pass filter 140c in the backup AGC circuit 202 is tuned to a pre-selected central office carrier frequency other than the frequency to which filter 140a is tuned. In this embodiment, filter 140c is tuned to the 120 kHz carrier frequency to thus pass only the 120 kHz carrier signal to averaging detector 142c for detection. Accordingly, the d.c. average of the detected 120 kHz carrier signal will be applied to comparator 90c for comparison with the fixed AGC reference (ground potential) so that the output voltage of comparator 90c will vary as function of only the 120 kHz carrier signal level.

As shown in FIGS. 3 and 4, the outputs of comparators 90a and 90c are OR'ed together by diodes 207 and 208 in a manner corresponding to that just described for the comparators 90 and 90b. The OR gate established by diodes 207, 208 is similar in operation to that just described for diodes 204, 205. Thus, diode 207 will normally be forward biased when the 104 kHz carrier signal is transmitted and the AGC circuit 82 is functioning properly. Should the transmission of the 104 kHz carrier signal be interrupted or should the AGC circuit 82 malfunction, then diode 208 will become forward biased to automatically place the backup AGC circuit 202 into the active circuitry for continuing the supply of direct current to diode strings 104, 106, 104a and 106a, providing for the continued, uninterrupted operation of the repeater.

According to a conventional practice, the central office terminal equipment (COT1–COT8) contains a number of circuit cards, usually printed circuit cards, in which each card usually contains the componentry (receivers and transmitters) for two adjacent channels. For example, one card may contain the componentry for the 160 kHz and 152 kHz channels. The next card may then contain the componentry for the 144 kHz and 136 kHz channels, and so on. Thus, removal of the card containing the 160 kHz channel will not interfere with the operation of the card containing the 144 kHz channel. With such an arrangement the 120 kHz carrier channel and the 104 kHz carrier will also be on separate circuit cards, so that removal or malfunction of the former does not interfere transmission of the 120 kHz carrier signal.

In addition to the backup AGC circuits 200 and 202, the slope detector circuit may be optionally equipped with a wideband detector 220 for clamping (i.e., limiting) the level of the carrier signal composite at the output of the high pass filter 48, thereby preventing the level of this carrier signal composite from exceeding a pre-selected amount. Such clamping action by detector 220 prevents clipping and resultant harmonics which would otherwise occur if the level of the composite carrier signal becomes too high.

As shown in FIG. 4, the wideband detector 220 comprises an averaging detector 142d which may have a circuit design configuration corresponding to that of the averaging detector 142. Accordingly, like reference characters have been applied to designate corresponding components of the averaging detector 142 and 142d except that the reference characters for averaging detector 142 have been suffixed by the letter "d" to distinguish them from the reference characters for averaging detector 142.

As shown, the composite central office-transmit carrier signal at the output of the high pass filter 48 is coupled by a resistor 222 and a coupling capacitor 224 to the input of averaging detector 142d (at the base of transistor 146d) without any filtering. Thus, averaging detector 142d will rectify the complete carrier signal composite which may consist of up to eight channels in this embodiment. The d.c. output voltage of averaging detector 142d is therefore equal or proportional to the average of the rectified composite carrier signal rather than a single carrier signal as is the case with the other averaging detectors in the AGC circuits. As shown, the output of the averaging detector 142d is OR'ed into the collector of transistor 146b in AGC circuit 200 by a diode 230. Diode 230 is connected between the output node or terminal 232 of averaging detector 142d and the collectors of transistors 146b, 147b.

As long as the level of the composite of carrier signals at the output of the high pass filter 48 remains below a preselected level (e.g., 12 volts peak-to-peak) the interconnected collectors of transistors 146d and 147d will remain at some positive voltage above ground, thus back biasing diode 230. As a result, the wideband detector 220 will be out of the active circuit and will have no effect upon the signal supplied by the AGC circuits in the slope detector 79. Notwithstanding this condition, however, it will be noted that the transistor pair 146d, 147d, will nevertheless still conduct on the positive alternations of the incoming carrier signal composite to thus provide for the continuous rectification of the carrier signal composite.

When the level of the carrier signal composite at the output of high pass filter 48 exceeds the pre-selected value (e.g., 12 volts peak-to-peak) the common collector voltage for transistors 146d and 147d will be driven negatively with respect to the positive supply voltage, thus forward biasing diode 230. When this happens, the common collector voltage of transistor 146b and 147b will be set by the common collector voltage of transistors 146d and 147d and will be held at the common collector voltage of transistors 146d and 147d less the 0.6 voltage drop across diode 230. Thus when the common collector voltage of transistors 146d and 147d is pulled down to −0.6 volts, then the common collector voltage of transistors 146b and 147b will be pulled down to zero volts. At zero volts, both the positive and negative inputs to comparator 90b will become equal thus making the output of comparator 90b zero volts. Thus, if the level of the carrier signal composite at the output of the high pass filter 48 for some reasons becomes greater than the pre-selected value (12 volts peak-to-peak), the positive input of comparator 90b will be driven negative with respect to the ground reference potential at the comparators's negative input, thus making the output of comparator 90b lower than that of comparator 90 to forward bias diode 205 and thus enabling comparator 90b to drive the output node 206 for feeding an increased amount of direct current through the diode attenuator strings 86 and 87. When this happens, the impedance of the diode attenuator springs 86, 87 decreases to increase the attenuation of the incoming composite of the central office-transmit carrier signals, thereby decreasing the level of the outgoing carrier signal composite at the output of high pass filter 48. The attenuation continues to increase until the level of the outgoing carrier signal composite at the output of filter 48 is reduced to or below the pre-selected level (12 volts peak-to-peak). Thus, if the incoming carrier signal composite level is high enough to drive the level of the outgoing carrier signal composite (at the output of high pass filter 48) above the pre-selected value (12 volts peak-to-peak) then the wideband detector 220 will act to limit the increase in the outgoing signal level by increasing the attenuation of the incoming signal composite.

Figure 6:
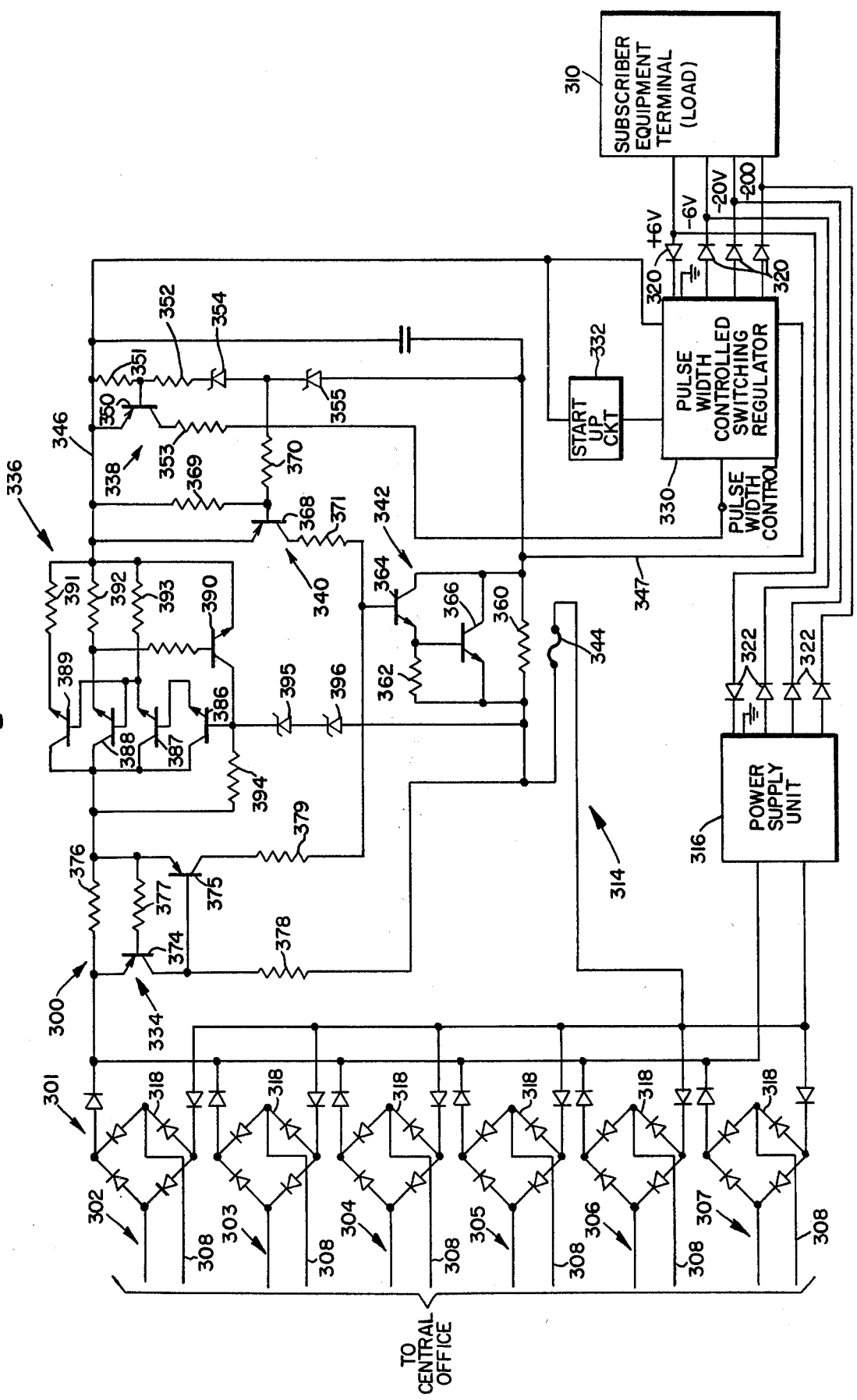
FIG. 6 is a circuit diagram of a redundant power supply incorporating additional principles of this invention.

In FIG. 6, a subscriber power supply 300 is shown for a 48 channel subscriber carrier system 301 containing six frequency division multiplexed sub-systems of eight channels each. The sub-systems are indicated at 302, 303, 304, 305, 306, and 307. The general arrangement of the 48 channel system 301 may be of the type described in U.S. Pat. No. 4,087,639. Each carrier sub-system 302–307 may be the same as that shown in FIG. 1 and has its own two-conductor transmission line 308 for interconnecting the central office channel terminal equipment (not shown in FIG. 6) and the subscriber channel terminal equipment. According to this embodiment all 48 channels of the subscriber terminal equipment are located at a single terminal 310 and represents the load which is powered by the power supply 300.

Although illustrated for a 48 channel system having six transmission lines, the subscriber power supply is especially designed for use with anywhere from two eight-channel carrier systems up to and including six eight-channel systems. Loop resistance may be up 2400 ohms on each two-conductor transmission line with a remote (subscriber) terminal voltage of from +135 VDC to +270 VDC across each pair of transmission line conductors. Maximum direct current per conductor pair may be 100 ma. Operating power for the remote subscriber power supply is drawn from power supplies in the central office terminal equipment, there being one such central office power supply connected to each transmission line in system 301.

With the foregoing type of carrier system, it is advantageous to use a pulse width modulated switching regulator type of d.c. to d.c. converter (as indicated at 330 in FIG. 6). This type of converter maintains a constant input power which is equal to the output power demanded of it times the efficiency. If the input voltage drops, then the input current must increase to keep the input power constant. The increase in input current through the input resistance of the cable pairs, however, causes an additional voltage drop. This condition can easily continue if output filter capacitors are used, as is the normal practice, due to the charge current needed to bring the filter capacitors up to operating voltage. It will be appreciated that the foregoing condition can progress to a state having an input voltage near zero and a very large input current with a large power loss in series with the input resistance. The end result is that insufficient power will be delivered to the load.

To prevent such a latch-up, an input current sensor is usually used to reduce the power drawn from the input line when the current reaches a predetermined level approaching the normal full load current. However, if the normal full load current varies considerably (as is the case when only two carrier sub-systems are being utilized instead of all eight carrier sub-systems), no current limit point can be found to prevent the latch-up or a reduction in output capability.

To overcome this problem, a voltage sensor 338 is used to reduce the pulse width and thus the input power requirements to the switching regulator 330 when the input voltage drops below the half voltage point which is the maximum power transfer point. In this embodiment the half voltage point is 127 VDC. This pulse width reducing action limits the input current in the illustrated embodiment to a value equal to 135 volts divided by the input line resistance, allowing for losses across a voltage regulator-current limiter 336 (to be described later on) which is normally inactive.

Another problem in carrier systems is the interruption of service to customers due to a fault or component failure in the subscriber power supply. In this respect it is important that no single fault or component failure be allowed to affect more than a few customers. In a 48 channel carrier system, such as the one described above, the loss of eight channels may be tolerated, but no more. But where a single subscriber power supply is used for all 48 channels, as is the case in this example, a fault or component failure will affect an unacceptably large number of customers. To avoid this problem the power supply of this invention, which provides subscriber power to all 48 channels, is provided with a stand-by or back-up unit which automatically comes into operation in case of failure of any component in the primary supply.

Still referring to FIG. 6, power supply 300 comprises a pair of supply units or circuits 314 and 316, one acting as the backup for the other to provide the desired redundancy. Units 314 and 316 are connected in parallel, having their inputs connected through diode steering bridges 318 to the subscriber ends of transmission lines 308, and their outputs connected to the subscriber equipment terminal 310. The outputs of supply units 314 and 316 may be OR'ed together by diodes 320 and 322. Since supply units 314 and 316 are preferably of the same design, a description of the former will suffice for the latter.

As shown in FIG. 6, power supply unit 314 comprises the pulse width controlled switching regulator (also called a pulse width modulating switching regulator) 330, a conventional start-up circuit 332 for switching regulator 330, a line current sensor 334, the current limiter/voltage regulator 336, the voltage sensor 338, a further voltage sensor 340, a transistor switch 342 and a thermal sensitive disconnect fuse 344. Switching regulator 330 is connected to the subscriber terminal load 310 to power the subscriber terminal equipment. Reference is made to U.S. Pat. No. 4,027,224 for a general description of the type of regulator used in this invention. Regulator 330 may be of a conventional circuit having a pulse width control point or mode, one suitable design being the SHQ-150W by Power-One, Incorporated.

In regulator 330, direct current (which is conducted by transmission lines 308 from the central office) at one voltage is converted into direct current at a lower voltage by applying relatively high voltage pulses through an unshown transformer or inductor to periodically charge a capacitor (not shown) in the switching regulator to a lower voltage. The regulating portion of the regulator is effective to regulate the duration or width of each charging pulse in such a manner that the charge stored in the capacitor is normally just enough to restore the voltage across the capacitor to the lower voltage mentioned above. Switching regulator 330 is designed to power a maximum load (i.e., the subscriber terminal equipment for six eight-channel carrier systems in this embodiment). The load driven by switching regulator 330 will reduce, however, for applications where fewer than all six carrier systems are utilized, thus creating a problem of starting up the switching regulator.

To overcome this problem and to insure that switching regulator 330 (which is a constant power load) can start up under load with a reasonable resistance in series with the source voltage, voltage sensor 338 is connected to the pulse width control input of regulator 330 in the manner shown to prevent the line voltage across the conductors 346 and 347 from dropping below a preselected value, which in this embodiment is selected to be the half-power point of 135 volts. To accomplish this, voltage sensor 338 comprises a PNP transistor 350, resistors 351, 352, and 353, a 6.8 volt zener diode 354 and a 120 volt zener diode 355, all connected in the manner shown in FIG. 6. The collector-emitter path of transistor 350 is connected between conductor 346 and the regulator's pulse width control input so that when transistor 350 is turned on, line current will be conducted to the regulator's pulse width control input.

Transistor 350 is held in conduction as long as the line voltage across conductors 346 and 347 exceeds the sum of the zener voltages of zener diodes 354 and 355, which sum is approximately 127 volts in this embodiment. If the line voltage drops below 127 volts, however, transistor 350 will no longer be supplied with bias current because of diodes 354 and 355. As a result, transistor 350 will turn off. When this happens, the regulating or pulse width control portion of switching regulator 330 will reduce the switching regulator's on-time pulse width, thus reducing the input current which is drawn from the line 346, 347. The line voltage across conductors 346, 347 will therefore rise until conduction of transistor 350 is re-established somewhere between cutoff and saturation.

The voltage sensor 338 (which comprises transistor 350) thus senses a drop in the d.c. line voltage across conductors 346 and 347 below a pre-selected value (127 volts in this embodiment) and in response to sensing such a voltage drop, sensor 338 causes regulator 330 to reduce the pulse width and thus the amount of current that the switching regulator can draw. This action in turn increases the line voltage to a value where transistor 350 again conducts.

With the reduced pulse width, the unshown capacitor in switching regulator 330 will charge up to the desired voltage, but at a slower rate because of the reduction in the switching regulator's demand for charging current. When the unshown capacitor in switching regulator 330 becomes fully charged, the voltage across regulator 330 will come up to the normal operating value (e.g., between 140 volts and 270 volts), thus cutting off the pulse width-reducing action of voltage sensor 338. In this manner switching regulator 330 is capable of starting up under a wide range of subscriber terminal loads and under long line and low input current conditions.

With continued reference to FIG. 6, fuse 344 and a resistor 360 of relatively small size (e.g., 300 ohms) are connected in series in conductor 347 and hence in series with the line current. Resistor 360 provides the heat for operating the thermal sensitive fuse 344. For this purpose, fuse 344 is preferably mounted in direct contact with resistor 360. The contacting surfaces of fuse 344 and resistor 360 may be flat. Fuse 344 may also be advantageously mounted in contact with a common heat sink for transistors 366, 388 and 389 so that overheating of any one of these transistors will cause the fuse to open. As shown, transistor 366 forms a part of transistor switch 342, and transistors 387 and 388 form a part of the current limiter/voltage regulator 336. Switch 342 is normally conditioned to keep transistor 366 biased on to effectively short circuit resistor 360.

Switch 342 will respond to the concomitant occurrence of two conditions (to be described shortly) to open the circuit through transistor 366 and to thereby cause all of the line current to pass through resistor 360. When this happens, sufficient heat is generated by resistor 360 to cause fuse 344 to fail. Failure of fuse 344 disconnects the power supply unit 314 from the line by opening the circuit which conducts operating current to switching regulator 330.

To accomplish the foregoing functions, switch 342 may be of any suitable design and is shown to comprise transistor 366 and a further NPN transistor 364. Transistors 364 and 366 are connected in the manner shown in FIG. 6, whereby when transistor 364 is conducting it will keep transistor 366 in conduction, but when transistor 364 is turned off, transistor 366 will also turn off. When transistor 364 and 366 are conducting, transistor 366 will conduct most of the current around resistor 360 because of its collector-emitter saturation voltage of 1 to 2 volts. When transistors 364 and 366 are turned off, the circuit for conducting line current through transistor 366 and around resistor 360 will open, thus causing all of the line current to be conducted through resistor 360.

Bias current for maintaining transistor 364 in conduction is supplied from two sources, namely voltage sensor 340 and current sensor 334. Transistor 364 is kept in its conducting state when bias current is supplied from either one or both of these sources, but when the biasing currents from both of these sources are concomitantly interrupted, transistor 364 will turn off. Resistor 362 is of relatively large size (e.g., 1 K ohm) to insure that transistor 366 will turn off when both of the above-mentioned bias current sources are removed.

Voltage sensor 340 comprises an NPN transistor 368, resistors 369, 370 and 371 and zener diode 355, all connected to the manner shown in FIG. 6.

The collector-emitter path of transistor 368 is connected between conductor 346 and the base of transistor 364 to conduct bias current to transistor 364. Bias current for keeping transistor 368 in its conducting state is conducted by zener diode 355. With these circuit connections it will be appreciated that when the line voltage across conductors 346 and 347 drops below the 120 volt zener voltage of zener diode 355, zener diode 355 will interrupt the supply of bias current for transistor 368, thus causing transistor 368 to turn off and thus interrupting the supply of biasing current to transistor 364 by way of transistor 368.

Current sensor 334 comprises a pair of PNP transistors 374 and 375 and resistors 376, 377, 378 and 379 all connected in the manner shown in FIG. 6. Resistor 376 is connected in conductor 346 in series with the line current, so that the voltage drop across resistor 376 varies with the magnitude of line current. As such, resistor 376 senses the magnitude of line current being drawn by switching regulator 330. Resistor 376 is connected to transistor 374 to provide the base bias voltage for transistor 374.

The collector-emitter path of transistor 375 is connected between conductor 346 and the base of transistor 364 so that when transistor 375 is in its conducting state, it supplies biasing current to transistor 364. Transistor 374 has its collector-emitter path connected across conductors 346 and 347 and additionally has its collector connected to the base of transistor 375, so that the base bias voltage for transistor 375 is the collector voltage of transistor 374.

As long as the line current through resistor 376 is less than a pre-selected amount (100 ma in this embodiment) the voltage drop across resistor 376 is insufficient to turn transistor 374 on. With transistor 374 in its non-conducting state, the collector voltage of transistor 374 will be sufficient to bias transistor 375 into conduction. In its conducting state, transistor 375 will supply the biasing current for keeping transistor 364 in its conducting state.

If the line current becomes greater than 100 ma, the voltage drop across resistor 376 increases sufficiently to bias transistor 374 into condition. When this happens the collector voltage of transistor 374 is pulled down to a value that is insufficient to keep transistor 375 in its conducting state. Transistor 375 will therefore turn off to interrupt the supply of biasing current to transistor 364.

If a component failure in switching regulator 330 causes excessive current to be drawn by the switching regulator to such an extent that the line voltage across conductors 346 and 347 drops below 120 volts, zener diode 355 will terminate the supply of bias current to transistor 368. Transistor 368 therefore turns off to remove one of the two bias current sources for transistor 364. If the excessive line current drawn by switching regulator 330 exceeds 100 ma, then such condition is sensed by current sensor 334, causing transistor 375 to turn off to remove the second source of base bias for transistor 364. Thus, if both transistors 368 and 375 are concomitantly turned off by the foregoing conditions, then transistor 364 will turn off, causing transistor 366 to turn off to disconnect resistor 362. All of the line current will now be conducted by resistor 360.

Because of the current limiting action of the current limiter/voltage regulator 336, the voltage developed across resistor 360 will be between 30 volts and 60 volts for the illustrated embodiment causing resistor 360 to dissipate between 3 and 27 watts, which is sufficient to cause failure of fuse 344. Failure of fuse 344 completely and permanently disconnects the failed power supply unit (unit 314 in this example) from the line except for the steering diode bridges and line feed coils. Upon such a disconnection of supply unit 314, the second power supply unit 316 will start up and continue the supply of power to the subscriber terminal load, thus providing for the continued operation of the carrier system with only a short interruption.

The current limiter/voltage regulator 336 may be of any suitable design to protect the power supply from line voltage and current transients. In this embodiment the current limiter/voltage regulator 336 comprises NPN transistors 386, 387, 388, 389 and 390, resistors 391, 392, 393 and 394, a 150 volt zener diode 395 and a 100 volt zener diode 396, all connected in the manner shown in FIG. 6. Voltage transients will be limited by diodes 395 and 396 and current transients will be limited by operation of transistor 390, as is apparent from the illustrated circuitry.

By monitoring both line current (with current sensor 334) and line voltage (with voltage sensor 340) and by effecting disconnection of the power supply unit only upon the concomitent occurence of two conditions (i.e., line voltage dropping below 120 volts and line current exceeding 100 ma), the power supply described above is able to operate under an assortment of different normal operating conditions without blowing fuse 344. For example, more than 100 ma of line current will normally be drawn by switching regulator 330 initially upon start-up, but such a normal start-up condition will not result in the failure of fuse 344 because the line voltage will normally be greater than 120 volts because of voltage limiter 338. Furthermore, a line current in excess of 100 ma will normally be drawn when more than a preselected number of the carrier sub-systems (302–307) are actually used. For example, about 300 ma of line current will normally be drawn when all six of the carrier sub-systems 302–307 are used. The 100 ma minimum current required for removing the second source of bias current for transistor 364 prevents transistors 364, 366 from operating when insufficient power is available to resistor 362 to blow fuse 344. If less than 100 ma is available from the central office supply, the problem is elsewhere in the system.

The power is supplied from the central office terminal by a separate independent central office power supply for each of the transmission lines 308 in the overall system 301. With two transmission lines powering a 16 channel system at less than 2000 ohms, a failure of one line supply will not cause a system failure, but only a reduction of the channel off-hook capability. With six transmissions powering a 48 channel system at 2400 ohms, a failure of one line supply will reduce the off-hook capability from about 40 to 35. Thus, full redundancy is effected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A signal-amplifying telephone carrier repeater adapted to be connected to a two-conductor transmission line in a plural channel amplitude modulated telephone carrier system in which said transmission line has a preselected cable gauge and is connected to transmit a plurality of first frequency division multiplexed carrier signals in one direction from a signal source to the telephone carrier repeater and to transmit a plurality of second frequency division multiplexed carrier signals in the opposite direction from the telephone carrier repeater to a termination, said signal-amplifying telephone carrier repeater comprising first means responsive only to a first preselected one of said first carrier signals following its transmission over said line for producing a first d.c. control signal whose magnitude varies as a function of the level of just said first preselected one of said first carrier signals, second means responsive only to a second preselected one of said first carrier signals following its transmission over said line for producing a second d.c. control signal whose magnitude varies as a function of the level of just said second preselected one of said first carrier signals, said first and second preselected ones of the first carrier signals having different frequencies, and further means under the control of said d.c. control signals for automatically adjusting the level of each of said second carrier signals as a function of the cable gauge of said transmission line and the length of said transmission line between said source and said repeater to compensate for both the length and the cable gauge of said transmission line.

2. The signal-amplifying telephone carrier repeater defined in claim 1 wherein said further means includes (a) a frequency independent level adjusting circuit electrically connected to said first means for adjusting the level of each of said second carrier signals as a function of the magnitude of said first control signal and (b) a frequency dependent level adjusting circuit electrically connected to said second means for adjusting the level of each of said second carrier signals as a function of the magnitude of said second control signal.

3. The signal-amplifying telephone carrier repeater defined in claim 1 wherein said further means includes (a) a frequency independent level adjusting circuit electrically connected to said first means for adjusting the level of each of said second carrier signals as a function of the magnitude of said first control signal and (b) a frequency dependent level adjusting circuit electrically connected to said second means for adjusting the level of each of said second carrier signals as a function of the magnitude of said second control signal, the frequency of said first preselected one of said first carrier signals being greater than the frequency of said second preselected one of said first carrier signals.

4. The signal-amplifying telephone carrier repeater defined in claim 1 wherein said further means includes (a) a frequency independent level adjusting circuit electrically connected to said first means for adjusting the level of each of said second carrier signals as a function of the magnitude of said first control signal, but not as a function of its own carrier frequency and not as a function of the magnitude of said second control signal, and (b) a frequency dependent level adjusting circuit electrically connected to said second means for adjusting the level of each of said second carrier signals as a function of the magnitude of said second control signal and as a function of its own carrier frequency, but not as a function of the magnitude of said first control signal.

5. The signal-amplifying telephone carrier repeater defined in anyone of the preceding claims 2–4 including a gain adjusting circuit electrically connected to said further means, said gain adjusting circuit being under the control of said first and second control signals to adjust the level of each of said first carrier signals to a level which remains substantially constant independently of the length and cable gauge of said transmission line, said further means comprising (a) a first automatic gain control circuit for producing said first control signal and for providing said first control signal with a magnitude that varies with the d.c. average of a rectified form of said first preselected one of said first carrier signals following adjustment of its level by said gain adjusting circuit and (b) a second automatic gain control circuit for producing said second control signal and for providing said second control signal with a magnitude that varies with the d.c. average of a rectified form of said second preselected one of said first carrier signals following adjustment of its level by said gain adjusting circuit.

6. The signal-amplifying, telephone carrier repeater defined in claim 2 including third means responsive only to a third preselected one of said first carrier signals for producing a third d.c. control signal which varies as a function of the level of just said third preselected one of said first carrier signals, fourth means responsive only to a fourth preselected one of said first carrier signals for producing a fourth d.c. control signal which varies as a function of the level of just said fourth preselected one of said first carrier signals, means interconnecting said first and third means to feed said third control signal to said frequency independent level adjusting circuit in place of said first control signal whenever said first preselected one of said first carrier signals is not present, and means interconnecting said second and fourth means to feed said fourth control signal to said frequency dependent level adjusting circuit in place of said second control signal whenever said second preselected one of said first carrier signals is not present in said composite.

7. A signal-amplifying, telephone carrier repeater adapted to be connected to a signal transmission cable pair in a plural channel amplitude modulated telephone carrier system in which a first composite of frequency division multiplexed carrier signals is transmitted over a first portion of said cable pair from a first signal source to the repeater, and in which a second composite of frequency division multiplexed carrier signals is transmitted in the opposite direction over a second portion of said cable pair from a second source to the repeater, said signal-amplifying telephone carrier repeater comprising first means responsive only to a first pre-selected one of the carrier signals in said first composite for producing a first d.c. control signal that varies as a function of the level of just said first pre-selected one of said carrier signals in said first composite, second means responsive only to a second pre-selected one of said carrier signals in said first composite for producing a second d.c. control signal that varies as a function of the level of just said second pre-selected one of said carrier signals in said first composite, said first and second pre-selected ones of the carrier signals in said first composite having different frequencies, and further means under the control of said first and second control signals for adjusting the levels of the carrier signals in said first and second composites.

* * * * *